United States Patent
Baertlein

[11] Patent Number: 6,062,973
[45] Date of Patent: May 16, 2000

[54] CUTTING TOOL

[76] Inventor: Lee A. Baertlein, 1571 Granville Rd., Cedarburg, Wis. 53012

[21] Appl. No.: 09/350,061

[22] Filed: Jul. 8, 1999

Related U.S. Application Data

[63] Continuation of application No. 08/538,414, Oct. 2, 1995, which is a continuation-in-part of application No. 08/035,420, Mar. 23, 1993, Pat. No. 5,454,754.

[51] Int. Cl.$^7$ .................................................... A22C 17/00
[52] U.S. Cl. .............................. 452/166; 452/49; 452/64; 30/228
[58] Field of Search ............................... 452/49, 50, 166, 452/64, 63; 30/228, 187, 245

[56] References Cited

U.S. PATENT DOCUMENTS

| | | | |
|---|---|---|---|
| 1,085,793 | 2/1914 | Boettger | 452/64 |
| 1,349,916 | 8/1920 | Rece | 452/64 |
| 4,241,631 | 12/1980 | Salvatore | 83/411 |
| 4,662,371 | 5/1987 | Whipple | 128/312 |
| 4,686,767 | 8/1987 | Ramun et al. | 30/134 |
| 5,083,971 | 1/1992 | Karubian et al. | 452/64 |
| 5,152,713 | 10/1992 | Baertlein | 452/64 |
| 5,187,868 | 2/1993 | Hall | 30/134 |
| 5,421,773 | 6/1995 | Meyer | 452/166 |
| 5,514,031 | 5/1996 | Meyer | 452/166 |

Primary Examiner—Willis Little
Attorney, Agent, or Firm—Jansson, Shupe, Bridge & Munger, Ltd.

[57] ABSTRACT

A cutting tool is provided which includes a cutter blade assembly. The cutter blade assembly is adaptable to a universal power head. The cutter blade assembly includes a pair of plates pivotally mounted on the power head. The pair of plates are mounted in a parallel spaced relationship to each other to form a space therebetween. Each plate of the pair of plates has an inside edge on one end thereof. The cutter blade assembly also includes a cutter blade mounted on the power head for pivotal motion in the space between tne pair of plates and a cutting edge on the cutter blade. The cutting edge has at least one point therealong which is contained in an imaginary line transverse to imaginary lines containing the inside edges of each plate of the pair of plates. The cutter blade and the pair of plates pivot simultaneously in opposite directions with respect to each other for the cutting edge of the cutter blade to cooperate with the inside edges of each plate of the pair of plates to cut a material to be cut. There is a member for supporting the plates in parallel spaced relationship, wherein the member is mounted on one end of each plate of the pair of plates. The member is a cutting blade having a curved cutting edge and the cutter blade has a curved cutting edge which are complementarily shaped for cutting a material to be cut.

14 Claims, 3 Drawing Sheets

CUTTING TOOL

RELATED APPLICATION

This application is a continuation of U.S. Pat. Ser. No. 08/538,414 filed Oct. 2, 1995, which is a continuation-in-part of U.S. patent application Ser. No. 08/035,420, filed on Mar. 23, 1993, entitled: "Toe Web Gland Cutting Tool." The cutting tool is readily adaptable to a universal power head such as shown and described in U.S. Pat. No. 5,152,713, entitled "Universal Power Head For Hand Operated Tools."

FIELD OF THE INVENTION

The present invention relates to a declipper for removing the clip from a sausage package and more particularly to a double curved cutting blade assembly which is readily adapted for connection to a universal power head.

BACKGROUND OF THE INVENTION

A particularly troublesome operation in the handling of packaged meats is the removal of the metal clip attached to the end of the package. The clip is mounted in abutting relation to the end of the package, thus making it difficult to remove the clip.

SUMMARY OF THE PRESENT INVENTION

The cutter blade assembly according to the present invention is designed to remove the clip provided on the end of a sausage package. The blade assembly includes a pair of plates which are mounted on an universal power head in a parallel spaced relation with a curved blade mounted on the end of the plates. A planar blade is pivotally mounted in the space between the plates which includes a curved cutting edge on the outer end of the blade. The planar blade passes through the space between the plates in close proximity to the curved blade to cut the clip from the package and discharge the clip through the space between the end of the plates. The cutter blade assembly is pivotally mounted on a universal head and simultaneously pivots the plates and the blade to completely remove the clip.

One of the primary advantages of the blade assembly is the ability to perform this step in the process of opening a sausage package in a single step.

A further advantage of the cutter blade assembly is the provision of a blade on the end of the inner blade which draws the clip into engagement with the curved blade provided between the side plates thus completely removing the clip in a single stroke.

The clip removing assembly is mounted on a universal head for simultaneously pivoting the arcuate cutting blades toward each other to quickly and easily cut the clip from the end of the sausage package.

Other principal features and advantages of the invention will become apparent to those skilled in the art upon review of the following drawings, the detailed description and the appended claims.

Figure 1:
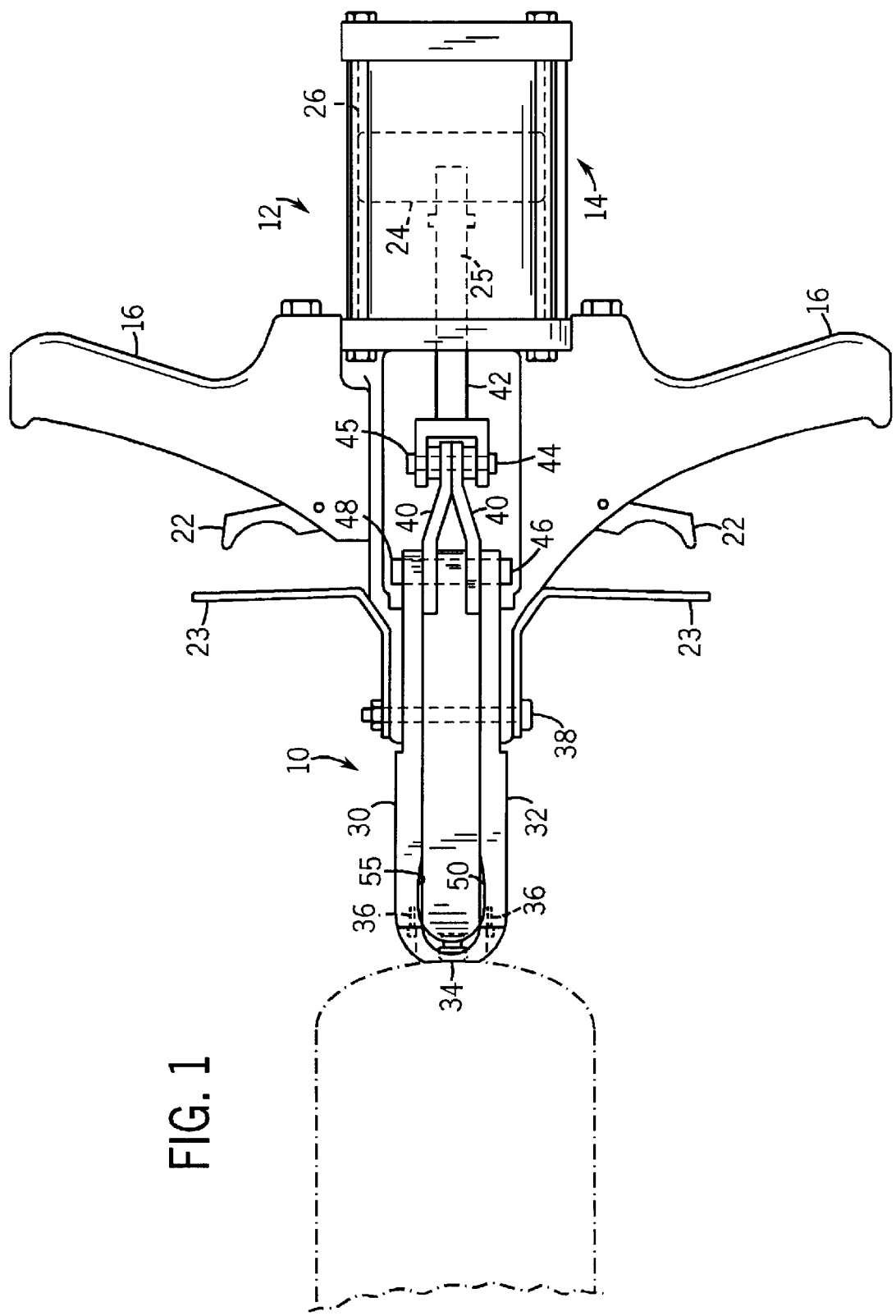
FIG. 1 is a top view of the declipper blade assembly shown mounted on a universal power head.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

The declipper blade assembly 10 according to the present invention as shown in the drawings is mounted on a universal power head 12. The power head generally includes a piston and cylinder assembly 14 having a handle 16 mounted on each side of the power head. The declipper blade assembly 10 is mounted on the power head 12 and actuated by means of the pneumatic piston and cylinder assembly 14. The piston and cylinder assembly 14 is actuated by a trigger 22 provided on the handles 16. A trigger guard 23 is provided in the front of each trigger 22. As is generally understood actuation of the piston and cylinder assembly 14 is accomplished by gripping one of the handles 16 and squeezing the trigger 22. Actuation of the trigger 22 pressurizes the piston and cylinder assembly 14 to close the blade assembly 10 on the clip 47 on the end of the package 51.

Figure 2:
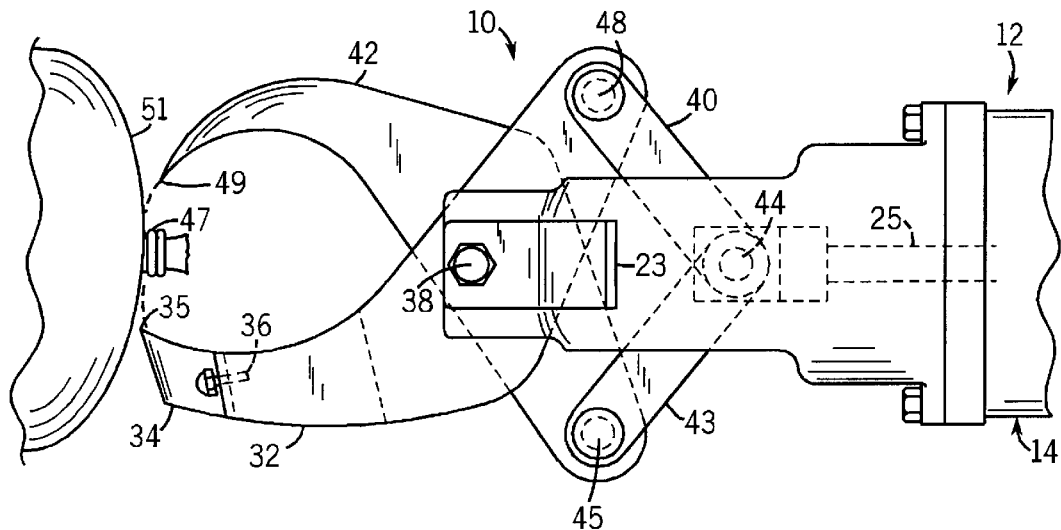
FIG. 2 is a side view of the declipper shown connected to the power head.
Figure 3:
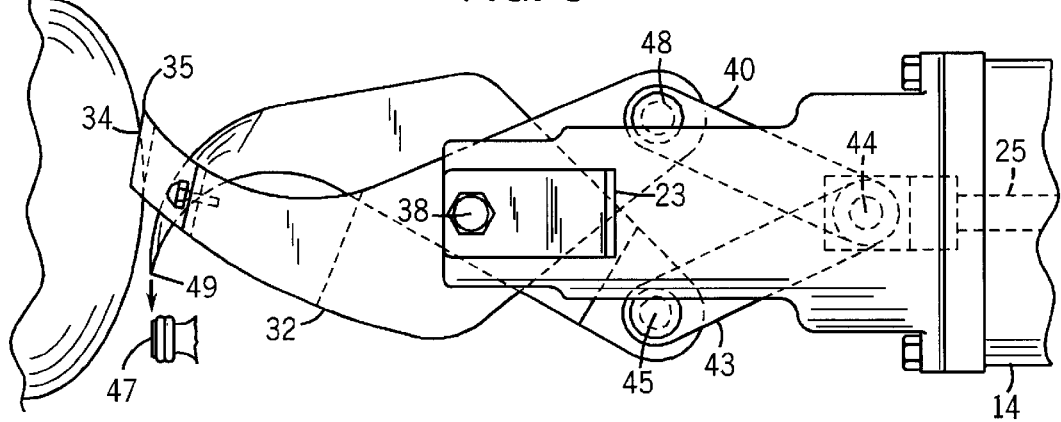
FIG. 3 is a view similar to FIG. 2 showing the declipper assembly in the closed position.
Figure 4:
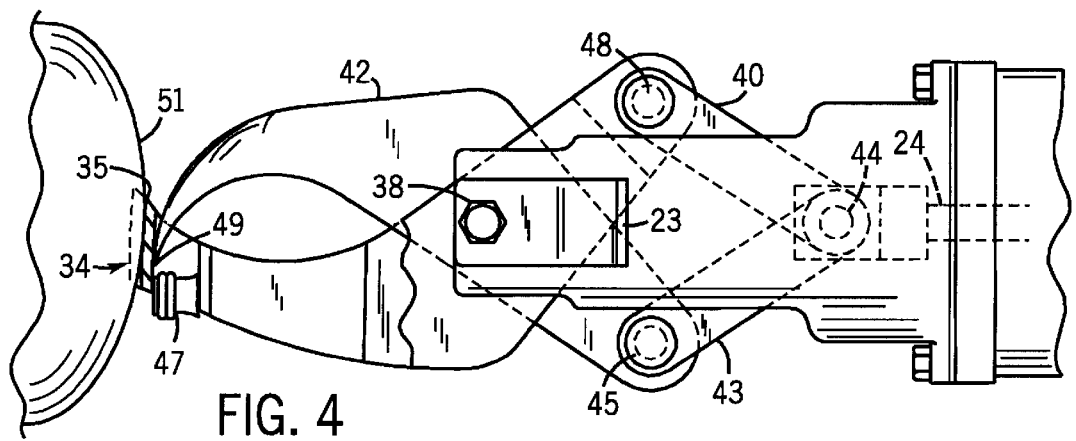
FIG. 4 is a view of the declipper assembly partly broken away to show the cutting blades.
Figure 5:
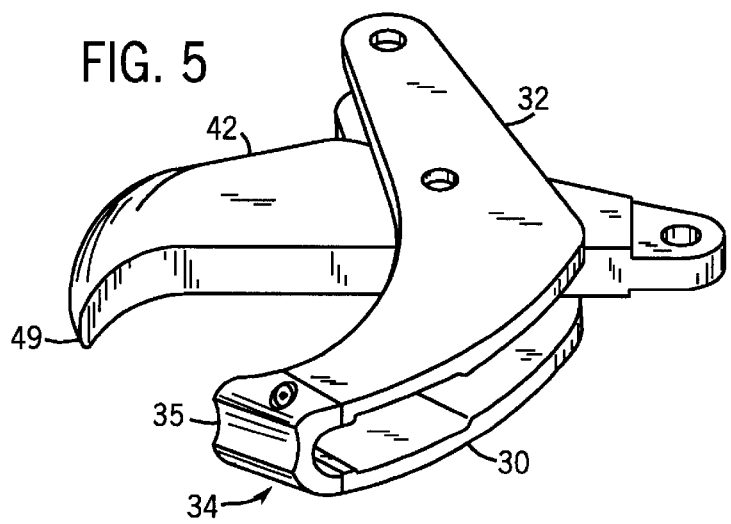
FIG. 5 is a perspective view of the declipper blade assembly.

Referring to FIGS. 2 and 3 the declipper assembly 10 according to the invention is shown mounted on the universal power head 12 which is actuated by means of the pneumatic piston and cylinder assembly 14. As noted above the piston and cylinder assembly 14 is actuated by means of one of the triggers 22 provided on handle 16. A piston 24 is provided in the cylinder 26 and is connected to the blade assembly 10 by means of a piston rod 25. Actuation of one of the triggers 22 pressurizes the forward end of the cylinder 26 to close the declipper blade assembly 10 on the rearward stroke of the piston 24 which is connected to the piston rod 25. The blade assembly 10 is opened on the forward stroke of the piston 24.

The declipper assembly 10 generally includes a pair of side plates 30 and 32, FIG. 1, connected at one end by means of a cutting blade 34 which is secured to the end of the side plates 30 and 32 by means of screws 36. The side plates 30 and 32 are pivotally mounted on a bolt 38 on handle 16. A declipper blade 42 having a curved cutting edge 49 is also pivotally mounted on bolt 38. It should be noted that the side plates 30 and 32 are connected to the piston and cylinder assembly 12 by means of a pair of links 40 secured to the piston rod 25 by bolt 44 and to the ends of the side plates 30 and 32 by a screw 46 and nut 48. The declipper blade 42 is also connected to the piston rod 25 by links 43 which are connected to bolts 44 and 45.

The side plates 30 and 32 are connected at their outer ends by means of the cutting blade 34 which has a curvature corresponding to the curvature of the edge 49 of the declipper blade 42. With this arrangement the edge 49 of the declipper blade 42 is aligned in the space between the metallic clip 47 and the end 51 of the sausage package. The curved cutting edge 35 of the cutting blade 34 is aligned in the space between the bottom of clip 47 and the end of the sausage package 51. The cutting edge 49 of the blade 42 is aligned in the space between the top of the clip 47 and the end of the sausage package 51. The cutting edge 49 of blade 42 will cut the clip 47 off the end of the sausage package. The clip will drop through the space 50 between the side plates 30 and 32. It should be noted that a relief 55 is provided on the inside surface of the plates 30 and 32 to provide sufficient clearance for the clip to drop between the plates 30 and 32.

Thus, it should be apparent that there has been provided in accordance with the present invention a declipper tool that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A cutter blade assembly adaptable to a universal power head, said cutter blade assembly comprising:
   a pair of interconnected plates pivotably mounted on the power head in a parallel spaced relationship to each other to form a space therebetween, and each plate having an inside edge on one side thereof extending to a distal end thereof;
   a cutting blade joining said distal ends of said plates and having a first transverse cutting edge extending between said inside edges;
   a middle blade member mounted on the power head for pivoting motion between said plates and having a second transverse edge providing a cutting edge cooperating with said first transverse cutting edge, said middle blade member and said pair of plates pivoting simultaneously in opposite directions whereby said first transverse cutting edge and second transverse edge pass each other in shearing action to cut a material to be cut.

2. The cutter blade assembly of claim 1, wherein said cutting blade supports said plates in said parallel spaced relationship.

3. The cutter blade assembly of claim 2, wherein said cutting blade has a curved cutting edge.

4. The cutter blade assembly of claim 3, wherein said middle blade member has a curved cutting edge.

5. The cutter blade assembly of claim 4, wherein said curved cutting edge of said cutting blade and said curved cutting edge of said middle blade member are complementarily shaped in order to cut said material to be cut.

6. The cutter blade assembly of claim 5, wherein said material to be cut is discharged through said space between said pair of plates.

7. The cutter blade assembly of claim 6, wherein said middle blade member includes an end for drawing said material to be cut between said pair of plates.

8. The cutter blade assembly of claim 1, wherein said material to be cut is discharged through said space between said pair of plates.

9. The cutter blade assembly of claim 1, wherein said middle blade member includes an end for drawing said material to be cut between said pair of plates.

10. The cutter blade assembly of claim 9, wherein said end for drawing said material to be cut between said pair of plates includes a hook.

11. A method of cutting a material to be cut using a cutter blade assembly adaptable to a universal power head, said method of cutting comprising:
    pivotably mounting a pair of interconnected plates on the power head in a parallel spaced relationship to each other to form a space therebetween, wherein each plate has an inside edge on one side thereof extending to a distal end thereof;
    joining said distal ends of said plates via a cutting blade having a first transverse cutting edge extending between said inside edges;
    mounting a middle blade member on the power head for pivoting motion between said plates and having a second transverse edge providing a cutting edge cooperating with said first transverse cutting edge;
    pivoting said middle blade member and said pair of plates simultaneously in opposite directions so that said first and second transverse edges pass each other in shearing action to cut a material to be cut.

12. The method of claim 11, wherein simultaneously pivoting said middle blade member and said pair of plates causes said material to be cut to be discharged through said space between said pair of plates.

13. The method of claim 11, wherein simultaneously pivoting of said middle blade member and said pair of plates completely removes said material to be cut in a single step.

14. The method of claim 12, wherein simultaneously pivoting of said middle blade member and said pair of plates completely removes said material to be cut in a single step.

\* \* \* \* \*